United States Patent
Xhafa et al.

(10) Patent No.: US 11,601,904 B2
(45) Date of Patent: *Mar. 7, 2023

(54) NODE SYNCHRONIZATION FOR NETWORKS

(71) Applicant: TEXAS INSTRUMENTS INCORPORATED, Dallas, TX (US)

(72) Inventors: Ariton E. Xhafa, Plano, TX (US); Jianwei Zhou, Allen, TX (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,872

(22) Filed: Jun. 22, 2021

(65) Prior Publication Data

US 2021/0314887 A1 Oct. 7, 2021

Related U.S. Application Data

(63) Continuation of application No. 15/591,698, filed on May 10, 2017, now Pat. No. 11,076,370.

(60) Provisional application No. 62/346,886, filed on Jun. 7, 2016.

(51) Int. Cl.
*H04W 56/00* (2009.01)
*H04W 76/25* (2018.01)

(52) U.S. Cl.
CPC ......... *H04W 56/001* (2013.01); *H04W 76/25* (2018.02)

(58) Field of Classification Search
CPC .............................. H04W 56/001; H04W 76/25
See application file for complete search history.

(56) References Cited

U.S. PATENT DOCUMENTS

| 8,184,653 | B2 | 5/2012 | Dain |
| 8,185,355 | B2* | 5/2012 | Nath ............... H04Q 9/00 702/176 |
| 8,515,433 | B2 | 8/2013 | Vaswani |
| 8,559,464 | B2 | 10/2013 | Caracas |
| 8,699,406 | B1 | 4/2014 | Charles |
| 9,019,824 | B2 | 4/2015 | Thubert |

(Continued)

OTHER PUBLICATIONS

IEEE Standard for Local and Metropolitan Area Networks, IEEE Std 802.15.4e—Apr. 2012, Part 15.4: Low-Rate Wireless Personal Area Networks (LR-WPANs), MAC Sublayer, Amendment to IEEE Std 802.15.4.—2011.

*Primary Examiner* — Huy D Vu
*Assistant Examiner* — Bailor C Hsu
(74) *Attorney, Agent, or Firm* — Mandy Barsilai Fernandez; Frank D. Cimino

(57) ABSTRACT

A network includes an intermediate node to communicate with a child node via a wireless network protocol. An intermediate node synchronizer in the intermediate node facilitates time synchronization with its parent node and with the child node. A child node synchronizer in the child node to facilitates time synchronization with the intermediate node. The intermediate node synchronizer exchanges synchronization data with the child node synchronizer to enable the child node to be time synchronized to the intermediate node before the intermediate node is synchronized to its parent node if the intermediate node has not synchronized to its parent node within a predetermined guard time period established for the child node.

20 Claims, 3 Drawing Sheets

(56) References Cited

U.S. PATENT DOCUMENTS

| | | |
|---|---|---|
| 9,281,937 B2 | 3/2016 | Hoshida |
| 9,386,552 B2 | 7/2016 | Mandiganal |
| 9,602,270 B2 | 3/2017 | Hartman |
| 9,800,506 B2 | 10/2017 | Vasseur |
| 9,801,150 B2 | 10/2017 | Wetterwald |
| 2002/0154782 A1 | 10/2002 | Chow |
| 2007/0115903 A1* | 5/2007 | Liu ...................... H04L 1/1887 370/338 |
| 2011/0002251 A1 | 1/2011 | Shin |
| 2011/0299472 A1 | 12/2011 | Kumar |
| 2013/0107999 A1 | 5/2013 | Mainaud |
| 2014/0071885 A1 | 3/2014 | Cherian |
| 2015/0245287 A1* | 8/2015 | Shudark ............ H04W 56/0015 370/311 |
| 2016/0037449 A1* | 2/2016 | Kandhalu Raghu .. H04W 48/00 370/311 |
| 2018/0103443 A1* | 4/2018 | Prakash ................ H04H 20/38 |
| 2020/0084819 A1* | 3/2020 | Abedini ................ H04W 76/18 |
| 2020/0178337 A1* | 6/2020 | Hanley ............... H04W 56/001 |

* cited by examiner

NODE SYNCHRONIZATION FOR NETWORKS

CROSS-REFERENCE TO RELATED APPLICATION

This application is a continuation of U.S. patent application Ser. No. 15/591,698, filed on May 10, 2017, which claims the benefit of U.S. Provisional Patent Application No. 62/346,886 filed on Jun. 7, 2016, and entitled SYSTEMS AND METHODS TO IMPROVE SYNCHRONIZATION VIA KEEP ALIVE FRAMES IN MULTIHOP NETWORKS, both of which are incorporated by reference herein.

TECHNICAL FIELD

This disclosure relates to networks, and more particularly to network nodes that can control the order in which nodes synchronize to facilitate node timing in the network.

BACKGROUND

Network time slotted protocols are widely used to establish communications between network nodes utilizing a predictable time frame slotting technique for nodes to communicate, where each network node communicates according to predefined time slots. Such protocols generally provide scheduled, contention-free channel access to improve throughput performance compared to carrier sense techniques. These protocols are often employed in the formation of ad hoc wireless communications networks, for example. Ad hoc wireless communications networks are formed dynamically as nodes come within range of existing network resources. These networks may be utilized in many applications to provide communications between lower level devices on the networks such as sensors and upper tier devices communicating with the sensors.

In some applications, routing protocols are created that define relationships in the network and how the network operates as conditions change. For example, each node within the network can have a preferred parent node for communications in an upwards direction and possibly having multiple child nodes for downward communications.

SUMMARY

This disclosure relates to network nodes that can control the order in which nodes synchronize to facilitate node timing in the network.

In one example, a network includes an intermediate node to communicate with a child node via a wireless network protocol. An intermediate node synchronizer in the intermediate node facilitates time synchronization with its parent node and with the child node. A child node synchronizer in the child node facilitates time synchronization with the intermediate node. The intermediate node synchronizer exchanges synchronization data with the child node synchronizer to enable the at least child one node to be time synchronized to the intermediate node before the intermediate node is synchronized to its parent node if the intermediate node has not synchronized to its parent node within a predetermined guard time period established for the child node.

In another example, a method includes transmitting a keep alive packet from a child node to an intermediate node requesting timing correction information for the child node. The method includes sending synchronization data from the intermediate node to the child node indicating a status of the intermediate node with respect to timing synchronization with its parent node. The method include synchronizing the child node to the intermediate node via the timing correction information if the intermediate node has not synchronized to its parent node within a predetermined guard time period established for the child node.

In yet another example, a method includes configuring a child node to communicate in a given time slot of a slot frame. The method includes configuring an intermediate node to communicate in a subsequent slot of the slot frame. The method includes synchronizing the timing of the child node to the intermediate node during the slot frame. The method includes initiating a subsequent time synchronization between the child node and the intermediate node before the intermediate node has synchronized to its parent node.

DETAILED DESCRIPTION

This disclosure relates to network nodes that can control the order in which nodes synchronize to facilitate node timing for communications in the network. The network can include an intermediate node to communicate with one or more child nodes via a wireless network protocol, which can include a time slotted channel hopping (TSCH) protocol, for example. An intermediate node synchronizer in the intermediate node initiates time synchronization with its parent node and with the child node(s). This can include exchanging timing correction information between nodes and communicating synchronization status of one node with respect to another node. A child node synchronizer in the child node allows time synchronization with the intermediate node. The intermediate node synchronizer exchanges synchronization data with the child node synchronizer to enable the child node to be time synchronized to the intermediate node based on the synchronization data before the intermediate node is synchronized to its parent node.

As a further example, in channel hopping networks, a coordinator node transmits periodic beacons that contain information to facilitate nodes joining and communicating in the network. The information contained in the beacon could include the channels to be used at a specific time, timing information when this beacon is sent, link information, and so forth. To transmit data in these networks, the nodes can then use the link information from the beacon, which can include communications parameters (e.g., channel, time) to communicate and send data to their respective neighbors. To maintain timing synchronization between nodes in the network where each node begins its slot fame at the same time and communicates at the appropriate slot time within the slot frame, each node transmits a keep-alive frame to its parent node to achieve synchronization. For example, a child node 1 with its parent being the intermediate node 2 can send a keep-alive frame to the intermediate node 2 every 25 seconds.

In some cases however, the intermediate node may synchronize to its parent before synchronizing to its child node which can create a substantial time differential between the intermediate node and the child node that is outside the guard band of the child node. The guard band defines the maximum amount of time that the child node can be out of synchronization with the intermediate node and still synchronize to intermediate node. The child node and intermediate node synchronizers described herein control the synchronization sequence such that the timing of the computed slot fame of the child node is first synchronized to the intermediate node's slot frame (its parent) before the intermediate node synchronizes its slot frame to its parent node. This sequence and controls, in turn, help minimize the time difference between clocks running the child and intermediate node before synchronization occurs between the intermediate node and its parent node.

Figure 1:
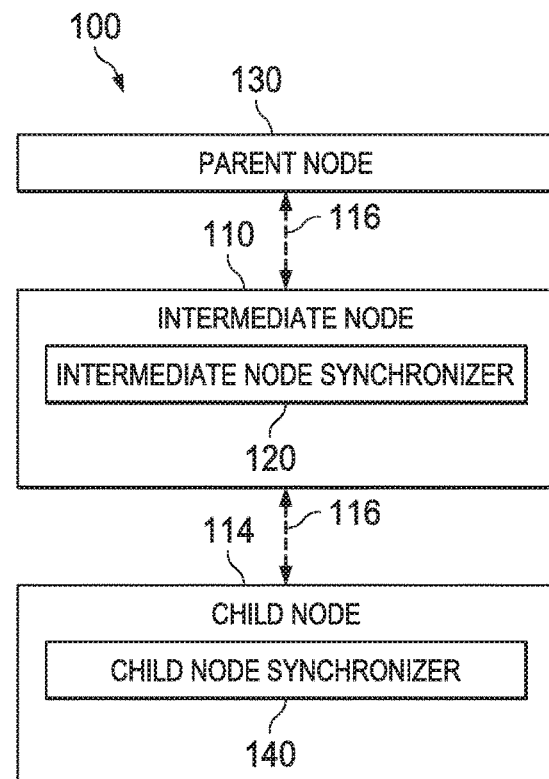
FIG. 1 illustrates an example network where nodes can control the order in which nodes synchronize to facilitate node timing in the network.

FIG. 1 illustrates an example network 100 where nodes can control the sequence in which nodes synchronize with respect to each other to facilitate inter-node timing in the network. The network includes 100 a plurality of nodes arranged in hierarchy. The nodes include an intermediate node 110 to communicate with at least one child node 114 via a wireless network protocol and wireless network connection 116. An intermediate node synchronizer 120 in the intermediate node 110 facilitates time synchronization with its parent node 130 via wireless connection 116 and with the child node 114 via wireless connection 116. A child node synchronizer 140 in the child node 114 facilitates time synchronization with the intermediate node 110 (e.g., exchanging timing correction information, status, and/or control data allowing synchronization to proceed). As used herein, the term "time synchronization" refers to sharing timing information between nodes that enables one node to correct its timing relative to timing implemented at another node. Since each node computes its own timing for the beginning of a slot frame, the time when the start of the slot frame that each node is assigned a slot time can differ due to clock inaccuracies, drift, and so forth.

Timing between nodes can drift for many reasons including temperature variations, component tolerances, and the fact that the respective nodes in many cases do not generally power up at the same time. Timing adjustments are typically specified with reference to the beginning of a slot frame such as illustrated and described herein with respect to FIG. 2. The intermediate node synchronizer 120 exchanges synchronization data with the child node synchronizer 140 to allow the child node 114 to have the beginning of its computed slot frame to be time synchronized with respect to the intermediate node 110 slot frame if the intermediate node has not synchronized to its parent node within a predetermined guard time period established for the child node. If the intermediate node 110 has synchronized within the guard period, the child node 114 can go ahead and synchronize to the intermediate node. If it is outside the predetermined guard period (e.g., intermediate node has not synchronized for 25 seconds) the intermediate node synchronizes its timing to the child node before it synchronizes to the parent node 130.

In this example, the network 100 includes three nodes— the intermediate node 110, the child node 114, and the parent node 130 that employ a wireless protocol to communicate across the wireless network connections 116. In other examples, more than three nodes may be employed (see e.g., FIG. 3). Also, other intermediate nodes may exist between the parent node 130 and the intermediate node 110, where the intermediate nodes become the parent nodes for the lower-level child nodes 114. Sometimes, child nodes 114 are referred to as leaf nodes if they appear at the bottom of the network hierarchy (e.g., no other nodes beneath them). The intermediate nodes 110 can be connected serially, in parallel with respect to each other such as to define the same or different level of hierarchy in the arrangement of nodes. In this example, the parent node 130 can be a root node or an intermediate node. The wireless network protocol can be any time division multiple access protocol (TDMA), such as a time slotted channel hopping (TSCH) protocol specified according to IEEE 801.15.4e, for example.

Figure 2:
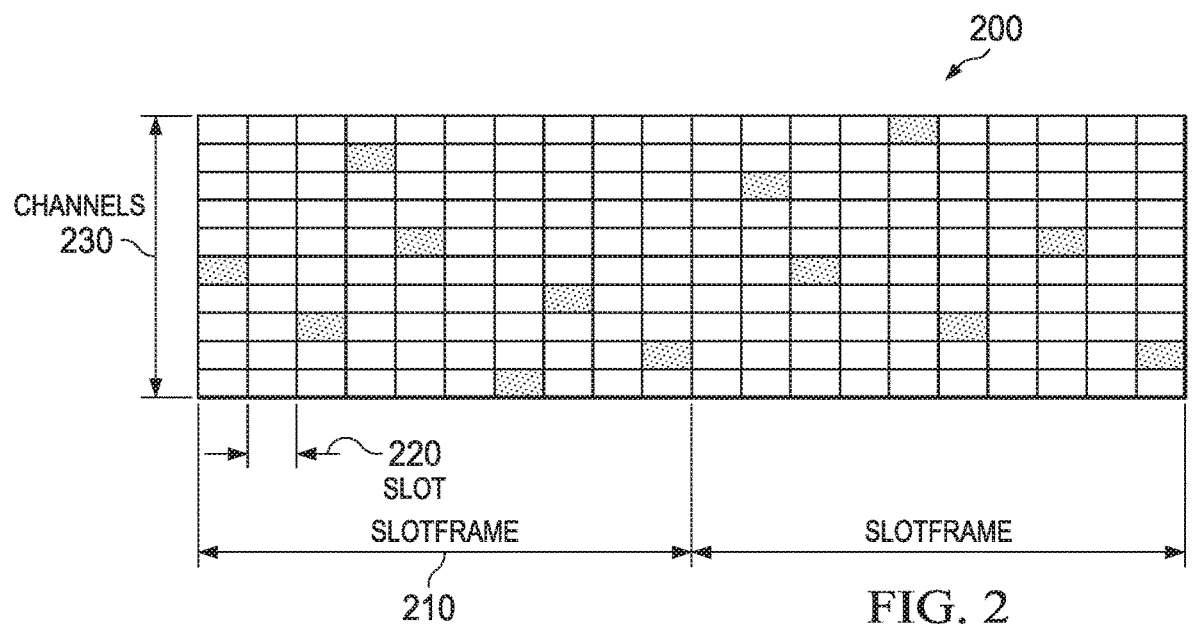
FIG. 2 illustrates an example of a network protocol for node time synchronization that utilizes channels, slot frames and time slots.

The TSCH protocol includes a sequence of slot frames with each slot frame subdivided into a number of slots having one or more channels configured for each slot (see e.g., FIG. 2). In one example, the child node 114 is configured with a lower slot number than the intermediate node to facilitate synchronizing the child node 114 to the intermediate node 110 before the intermediate node synchronizes to its parent node 130. The intermediate node 110 can notify the child node 114 that it has synchronized to its parent node 130, and the child node can send a keep alive packet to synchronize with the intermediate node in a subsequent slot frame to enable the child node to be time synchronized to the parent node of the intermediate node. Thus, the child node 114 being configured to communicate in an earlier slot time than the intermediate node, an earlier synchronization can occur between the intermediate node and child node than between the intermediate node and its parent node. Another subsequent synchronization between child node 114 and intermediate node 110 then enables the child node to then become synchronized to the parent node 130 due to the synchronization of the intermediate node and the parent node subsequent to the child nodes prior synchronization to the intermediate node.

In another example where time slot ordering is not maintained, the child node synchronizer 140 can send a keep alive packet to synchronize to the intermediate node synchronizer 120 to enable time synchronization between the nodes. This occurs, for example, when the child node first powers up and has not previously synchronized with any node on the network. The intermediate node synchronizer 120 can send a response to the child node synchronizer 140 responsive to receiving the keep alive packet. The intermediate node's response can specify that synchronization to its parent node 130 has not yet occurred or is otherwise not current, and thus does not include timing correction information for the child node. This may occur when the intermediate node 110 has gone for a long period of time (e.g., 25-50 seconds) without synchronizing to the parent node 130 and also may not have yet had opportunity to communicate its timing correction information to the child node 114. The response from the intermediate node synchronizer 120 can be transmitted in an acknowledge packet between the intermediate node 110 and the child node 114 or can be transmitted as part of a broadcast packet from the intermediate node.

If the timing correction information is not received, the child node synchronizer 140 can wait for a predetermined time period to receive the timing correction information from the intermediate node. After the predetermined wait time period has elapsed and the child node has not yet synchronized to the intermediate node, the child node synchronizer 140 sends another keep alive packet to the intermediate node synchronizer. In some cases, the intermediate node 110 can respond to the keep alive packet from the child node that the intermediate node has synchronized within a given guard time period. In other words, the intermediate node may indicate that it has very recently (e.g., within a predetermined guard time) been synchronized thus allowing the child node 114 to go ahead and synchronize to the intermediate node where the child node synchronizes to the intermediate node after the intermediate node has synchronized to its parent node if the given time period is less than the predetermined guard time.

Timing correction information between nodes can be exchanged and/or determined according to different techniques. In one example, the child node determines the timing correction information by computing a time difference between where an expected slot time computed by the child node for the intermediate node slot time and an actual slot time for a frame received from the intermediate node in the received broadcast packet occurs. In another example, the intermediate node determines the timing correction information by computing a time difference between where an expected slot time computed by the intermediate node for the child node slot time and an actual slot time for a frame received from the child node in the received acknowledgement packet occurs. The intermediate node sends the computed time difference as the timing correction information to the child node in response to the acknowledgement packet.

FIG. 2 illustrates an example of a network protocol diagram 200 for node time synchronization that utilizes channels, slot frames and time slots. As used herein, the term "time slot" refers to a designated period of time in a communications frame where a given node can receive and/or transmit data, where a frame is a basic unit of data transport that includes a set of contiguous time-slots transmitted according to a schedule that repeats over time. Some time slots in the frame are reserved for beacon communications and some time slots are shared meaning that any node can transmit data during a shared time slot. Shared time slots are also referred to as contention slots since multiple nodes can conflict with each other if each node transmits data during the shared slot. Other time slots are specifically reserved as receive time slots and transmit time slots for each respective node. As described herein, in some examples, child nodes can be assigned a lower slot number in the slot frame to allow the child node to synchronize to the intermediate node before the intermediate node synchronizes to its respective parent node.

The diagram 200 illustrates the mode of operation for a time slotted channel hopping (TSCH) media access control (MAC) although other protocols are possible. Time consists of a slot frame 210, where each slot frame consists of timeslots (or slots) 220. The communication between the nodes in the network occurs during the timeslots 220, although, it can happen across the same or different channels shown at 230. The channels are utilized to account for modulo differences between frames. For example, if a child node communicates on slot two in frame one of a ten slot frame, in the next frame it would communicate on the second slot of the fame which would be twelve slots from the beginning of the first frame. Thus, in the second frame, the child node could communicate on channel three during the second time slot of frame two. For example, if node A and node B are assigned slot 3 in slot frame 1, the channel that they are communicating in this slot frame is channel 3. However, in slot frame 2, the timeslot number is the same; however, the channel number is 5 this time. As noted above, each node computes its own start time for the beginning of the slot frame and where it expects each nodes corresponding slot time in the frame to occur. When nodes are out of time synchronization, the computed time by each node for the beginning of the slot frame 210 differs between nodes. The timing correction information described herein can be exchanged (e.g., sent from intermediate node to child) or computed (e.g., child node computes base on response in an acknowledgement packet and timing of a received beacon or data frame from the parent node).

Figure 3:
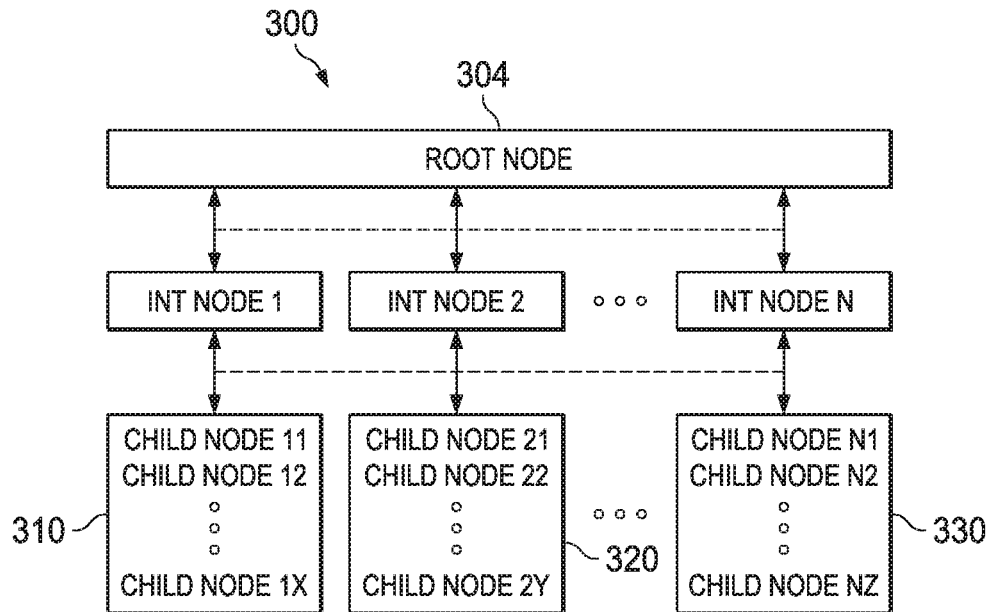
FIG. 3 illustrates an example network configuration having multiple intermediate and child nodes that can periodically exchange timing information.

FIG. 3 illustrates an example network configuration 300 having multiple intermediate and child nodes that can periodically change node functionality. A top level in the network 300 can include a root node 304 which serves as a parent node to one or more intermediate nodes shown as INT NODE 1 through INT NODE N, where N is a positive integer. Thus, each of the intermediate nodes can be viewed as a child node of the parent nodes. In turn, each of the intermediate nodes 1 though N can have one or more child nodes attached thereto. For example, at 310, child nodes 11 through 1X can report to intermediate node 1 operating as a parent node, where X is a positive integer. At 320, child nodes 21 through 2Y can report to intermediate node 2 operating as a parent node, where Y is a positive integer. At 330, child nodes N1 through NZ can report to intermediate node N operating as a parent node, where Z is a positive integer.

A dashed line is shown between nodes at the intermediate level and another dashed line is shown between nodes at the child level, where each dashed line represents that some nodes may be able to communicate between other members at a common hierarchy level and some nodes may not be able to communicate at the common level. In some network examples, intermediate nodes and/or child nodes may communicate with other nodes at their respective hierarchy levels depending on network topologies and network device locations. In other examples, communications can be routed to and/or from the respective child nodes, through the intermediate nodes, to the root node 304 in order to route messages from one node in the network to another node in the network that is not in the same linear path as the respective root node, intermediate node, and child node. In some examples, the node hierarchy can depend on the physical location and proximity among the nodes in the network (e.g., a centrally located node being a root or intermediate node and edge nodes being child nodes). Additionally or alternatively, node hierarchy can be determined according to the temporal order in which nodes are added to the network (e.g., first node being a root node and last added node being a child node).

The network 300 can be provided as a multi-hop wireless network that consists of the root node 304, intermediate nodes, and child nodes. The root node 304 connects the network to an internal or external network. The intermediate nodes connect the child nodes (and other intermediate nodes) to the root node and from there via the root node to the internal/external network. The definition of child nodes, in this example, is that there are no other nodes connected to these nodes. To transmit data in these networks, the nodes can then use the link information, which can be communication parameters (e.g., specified channel and network time), to communicate and send data to their neighboring nodes. In order to use the link information are to be synchronized and receive beacons. Intermediate nodes also transmit beacons and in these beacons, the same information that was sent by the coordinator is repeated. This is to allow other intermediate and child nodes to connect to and communicate within the network.

Figure 4:
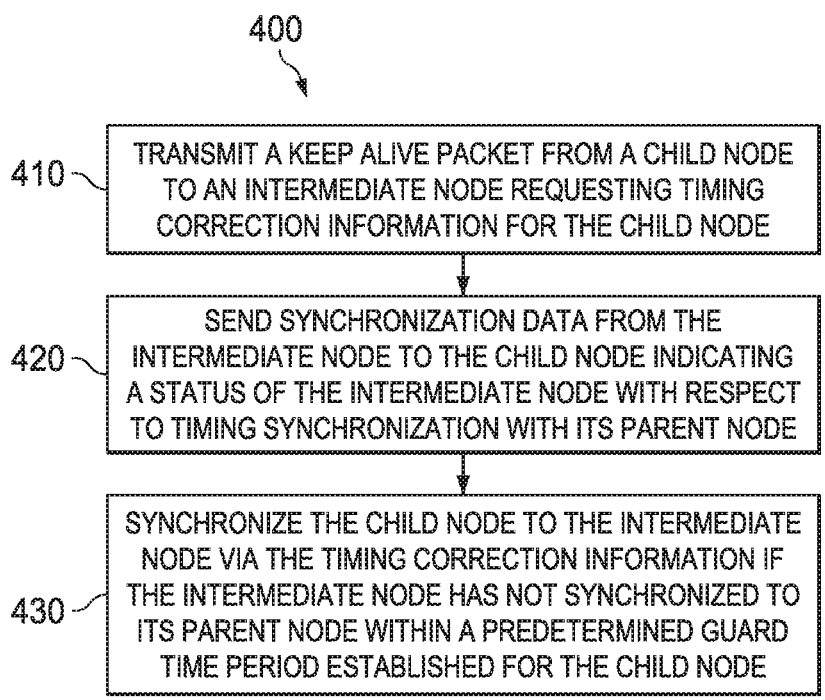
FIG. 4 illustrates an example method to control the order in which nodes synchronize to facilitate node timing in the network.
Figure 5:
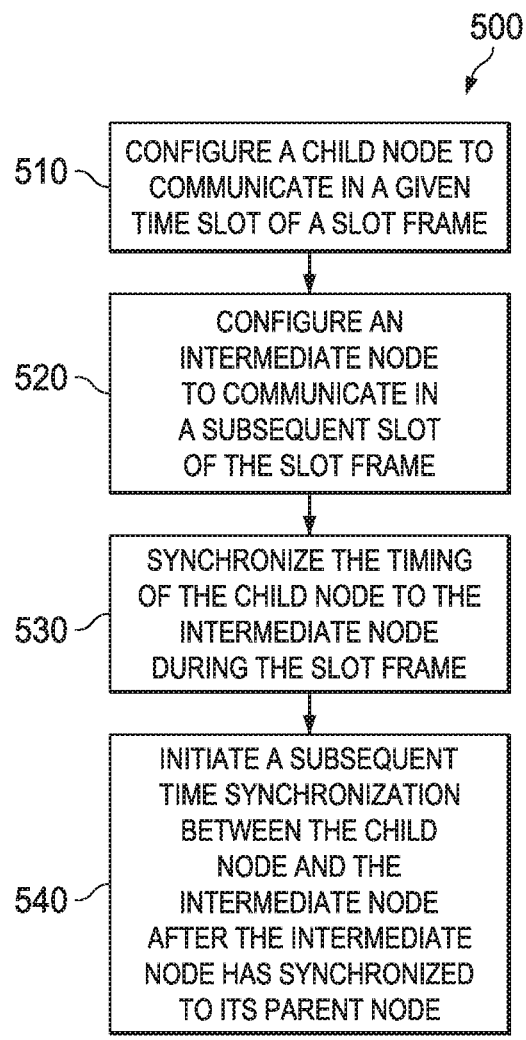
FIG. 5 illustrates another example method to control the order in which nodes synchronize to facilitate node timing in the network.

In view of the foregoing structural and functional features described above, example methods will be better appreciated with reference to FIGS. 4 and 5. While, for purposes of simplicity of explanation, the methods are shown and described as executing serially, it is to be understood and appreciated that the methods are not limited by the illustrated order, as parts of the methods could occur in different orders and/or concurrently from that shown and described herein. Such methods can be executed by various components configured as machine readable instructions stored in memory and executable in an IC or a processor, for example.

FIG. 4 illustrates an example method 400 to control the order in which nodes synchronize to set node timing parameters to enable synchronized wireless communications (e.g., wireless TDMA) in the network. At 410, the method 400 includes wirelessly transmitting a keep alive packet from a child node to an intermediate node requesting timing correction information for the child node (e.g., via child node synchronizer 140 of FIG. 1). At 420, the method 400 includes sending synchronization data from the intermediate node to the child node. The synchronization data indicates a status of the intermediate node with respect to timing synchronization with its parent node (e.g., via intermediate node synchronizer 120 of FIG. 1). At 430, the method 400 includes synchronizing the child node to the intermediate node via the timing correction information if the intermediate node has not synchronized to its parent node within a predetermined guard time period established for the child node. For example, the synchronization can be implemented via intermediate node synchronizer 120 and child node synchronizer 140 of FIG. 1, where intermediate node synchronizer sends timing correction information as part of the synchronization data or another data packet, and the child node synchronizer updates child node timing based on the correction information. As noted previously, timing correction information (e.g., the timing difference between the start of the intermediate node's slot frame and the child nodes slot frame) can be sent from the intermediate node to the child node based on an intermediate node slot frame/slot time computation. In another example, the intermediate node notifies the child when it is suitable to go ahead and synchronize (e.g., via synchronization data) where the child node computes the time correction information based on a received beacon from the intermediate node.

Although not shown the method 400 can also include sending a response from the intermediate node to the child node that synchronization to its parent node has not yet occurred and such response does not include timing correction information for the child node. The response can be transmitted in an acknowledge packet between the intermediate node and the child node or be transmitted as part of a broadcast packet from the child node, for example. The method can include waiting for a predetermined time period to receive the timing correction information from the intermediate node. This can include sending another keep alive packet to the intermediate node after a predetermined guard time period (e.g., a wait time interval) has elapsed and the child node has not yet synchronized to the intermediate node. The method can also include responding to the keep alive packet from the child node, such as by the intermediate node sending a response or other message to indicate that it has synchronized to its parent node within a given time period. The given time period can be set as a threshold duration to ensure that intermediate node has synchronized with its parent node sufficiently recently so that its child node(s) can reliably employ timing correction information to update local timing to enable synchronized network communications. For instance, this can include synchronizing to the intermediate node after the intermediate node has synchronized to its parent node if the given time period is less than a predetermined threshold.

FIG. 5 illustrates an example method 500 to control the order in which nodes synchronize in a wireless network. The method thus can be employed to ensure nodes are synchronized with respect to each other to provide node timing for synchronized wireless communications in the network. At 510, the method 500 includes configuring a child node to communicate in a given time slot of a slot frame (e.g., via software setting of child node). At 520, the method 500 includes configuring an intermediate node to communicate in a subsequent slot of the slot frame (e.g., via software setting of intermediate node). Thus, the intermediate node is assigned to communicate in a slot that is later than the slot to which each of its child nodes is assigned. At 530, the method 500 includes synchronizing the timing of the child node to the intermediate node during the slot frame (e.g., via intermediate node synchronizer 120 and child node synchronizer 140 of FIG. 1). For example, intermediate node synchronizer 120 sends timing correction information and child node synchronizer 140 updates child node timing with correction information. At 540, the method 500 includes initiating a subsequent time synchronization event between the child node and the intermediate node before the intermediate node has synchronized to its parent node (e.g., via intermediate node synchronizer 120 and child node synchronizer 140 of FIG. 1). Although not shown, the method 500 can also include notifying the child node the intermediate node has synchronized to its parent node and sending a keep alive packet to synchronize with the intermediate node in a subsequent slot frame to enable the child node to be time synchronized to the parent node of the intermediate node.

Figure 6:
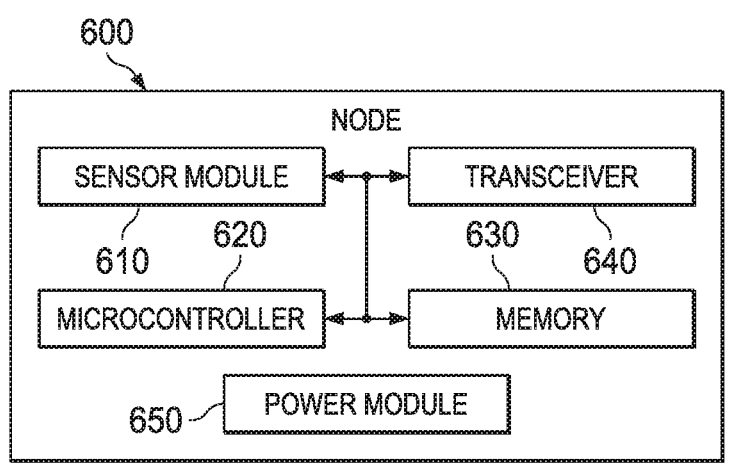
FIG. 6 illustrates an example node that can be employed in a network where nodes can control the order in which nodes synchronize to facilitate node timing in the network.

FIG. 6 illustrates an example node 600 that can be employed in a network where nodes can control the order in which nodes synchronize to facilitate node timing in the network. The example node 600 can be employed as part of a wireless sensor network (WSN) or system that contains a plurality (even hundreds of thousands) of sensor nodes. Such network/system examples where the node 600 can be implemented are shown with respect to FIGS. 1 and 3. Each node 600 can be equipped with a sensor module 610 to detect physical phenomena such as light, heat, pressure, and so forth. The sensor nodes in the WSN can communicate among themselves via radio signals utilizing substantially any wireless protocol such as Bluetooth, Bluetooth Low energy (BLE), WIFI, IEEE 802.11, and Worldwide Interoperability for Microwave Access (WiMAX) protcol, for example. The individual nodes in the WSN are inherently resource constrained, thus they tend to be limited in processing speed, storage capacity, and communication bandwidth. After the sensor nodes are deployed, they are responsible for self-organizing an appropriate network infrastructure often with multi-hop communication with them. The working mode of the sensor nodes may be either continuous or event driven for example.

Wireless sensor networks are spatially distributed autonomous sensors to monitor physical or environmental conditions, such as temperature, sound, pressure, and so forth and to cooperatively pass their data through the network to a main location. The more modern networks are bi-directional, also enabling control of sensor activity. The WSN is built of "nodes," where each node 600 is connected to one (or sometimes several) sensors. The WSN's can include ad-hoc networks where nodes can connect and leave the network dynamically. The node 600 generally includes a microcontroller 620, memory 630 (e.g., ferroelectric random access memory (FRAM)), wireless transceiver 640 (e.g., Texas Instrument CC2500 2.4 GHz RF transceiver), power module 650 (e.g., Texas Instrument BQ25504), along with the sensor module 610 (e.g., temperature detector, infrared detector, input/output module, analog conversion module). Intermediate nodes and child nodes generally share the same hardware and software but change their status (intermediate/child) depending if they are configured per a given communications layer operating with the node memory 630 and/or transceiver 640 such as a routing layer or a network layer, for example. A root node may have one additional level of capability over the intermediate/child nodes which is the ability to connect to other larger/broader networks such as the Internet.

Size and cost constraints on sensor nodes result in corresponding constraints on resources such as energy, memory, computational speed, and communications bandwidth. The topology of the WSNs can vary from a simple star network to an advanced multi-hop wireless mesh network. The propagation technique between the hops of the network can be routing or flooding. Software is typically reduced in complexity to conserve power on respective sensor nodes. Examples of node operating software systems can include TI-RTOS, TinyOS, LiteOS, and Contiki, for example. Other sensor nodes may operate as embedded systems without the use of a given operating system. The node syncronization capabilities described herein can be executed by the microcontroller 620 as executable instructions operating within the memory 630. In an alternative example, the microcontroller 620, memory 630, transceiver 640, and/or sensor module 610, can be implemented as an application specific integrated circuit.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A network, comprising:
   an intermediate node configured to communicate with a child node via a wireless network protocol, the intermediate node comprising an intermediate node synchronizer configured to facilitate time synchronization with a parent node and with the child node; and
   a child node synchronizer in the child node and configured to facilitate time synchronization with the intermediate node,
   wherein the intermediate node synchronizer is further configured to exchange synchronization data with the child node synchronizer to enable the child node to be time synchronized to the intermediate node before the intermediate node is synchronized to the parent node if the intermediate node has not synchronized to the parent node within a guard time period established for the child node.

2. The network of claim 1, wherein the wireless network protocol is a time slotted channel hopping (TSCH) protocol.

3. The network of claim 2, wherein the TSCH protocol includes a sequence of slot frames, wherein each slot frame is subdivided into a number of slots having one or more channels configured for each slot, and wherein the child node is configured with a lower slot number than the intermediate node to facilitate the child node synchronizing to the intermediate node before the intermediate node synchronizes to the parent node.

4. The network of claim 3, wherein the intermediate node is configured to notify the child node that the intermediate node has synchronized to the parent node and the child node is configured to send a keep alive packet to synchronize with the intermediate node in a subsequent slot frame to enable the child node to be time synchronized with respect to the parent node of the intermediate node.

5. The network of claim 1, wherein the child node synchronizer is configured to send a keep alive packet to synchronize to the intermediate node synchronizer to enable time synchronization between the nodes.

6. The network of claim 5, wherein the intermediate node synchronizer is configured to send a response to the child node synchronizer that synchronization to the parent node has not yet occurred and does not include timing correction information for the child node.

7. The network of claim 6, wherein the response is transmitted in an acknowledgement packet between the intermediate node and the child node or is transmitted as part of a broadcast packet received from the intermediate node.

8. The network of claim 7, wherein the child node is configured to determine the timing correction information by computing a time difference between an expected slot time computed by the child node for the intermediate node and an actual slot time for a frame received from the intermediate node in the received broadcast packet.

9. The network of claim 8, wherein the child node synchronizer is configured to send another keep alive packet, to the intermediate node synchronizer, after the guard time period has elapsed and the child node has not yet synchronized to the intermediate node.

10. The network of claim 9, wherein the child node is configured to synchronize to the intermediate node after the intermediate node has synchronized to the parent node if the given time period is less than a time threshold.

11. The network of claim 7, wherein the intermediate node is configured to determine the timing correction information by computing a time difference between an expected slot time computed by the intermediate node for the child node and an actual slot time for a frame received from the child node in the acknowledgement packet, and the intermediate node is configured to send the computed time difference as the timing correction information to the child node in response to the acknowledgement packet.

12. The network of claim 5, wherein the intermediate node is configured to respond to the keep alive packet from the child node to indicate that the intermediate node has synchronized within a given time period.

13. A method, comprising:
    transmitting a keep alive packet from a child node to an intermediate node requesting timing correction information for the child node;
    sending synchronization data from the intermediate node to the child node indicating a status of the intermediate node with respect to timing synchronization with a parent node; and
    synchronizing the child node to the intermediate node via the timing correction information if the intermediate node has not synchronized to the parent node within a guard time period established for the child node.

14. The method of claim 13, further comprising sending a response from the intermediate node to the child node that synchronization to the parent node has not yet occurred and does not include timing correction information for the child node.

15. The method of claim 14, wherein the response is transmitted in an acknowledge packet between the intermediate node and the child node or is transmitted as part of a broadcast packet from the intermediate node.

16. The method of claim 14, further comprising waiting for a time period to receive the timing correction information from the intermediate node.

17. The method of claim 16, further comprising sending, to the intermediate node, another keep alive packet after the time period has elapsed and the child node has not yet synchronized to the intermediate node.

18. The method of claim 17, further comprising responding to the keep alive packet from the child node that the intermediate node has synchronized within a given time period.

19. A method, comprising:
    configuring a child node to communicate in a given time slot of a slot frame;
    configuring an intermediate node to communicate in a subsequent slot of the slot frame;
    synchronizing the timing of the child node to the intermediate node during the slot frame; and
    initiating a subsequent time synchronization between the child node and the intermediate node before the intermediate node has synchronized to a parent node.

20. The method of claim 19, further comprising notifying the child node that the intermediate node has synchronized to the parent node and sending a keep alive packet to synchronize with the intermediate node in a subsequent slot frame to enable the child node to be time synchronized to the parent node of the intermediate node.

* * * * *